United States Patent
Kaz et al.

(10) Patent No.: US 7,106,077 B2
(45) Date of Patent: Sep. 12, 2006

(54) DEVICE AND METHOD FOR TESTING A MEMBRANE ELECTRODE ASSEMBLY

(75) Inventors: Till Kaz, Stuttgart (DE); Norbert Wagner, Sindelfingen (DE)

(73) Assignee: Deutsches Zentrum fur Luft- und Raumfahrt E.V., Bonn (DE)

(*) Notice: Subject to any disclaimer, the term of this patent is extended or adjusted under 35 U.S.C. 154(b) by 0 days.

(21) Appl. No.: 11/032,695

(22) Filed: Jan. 10, 2005

(65) Prior Publication Data

US 2005/0183966 A1    Aug. 25, 2005

Related U.S. Application Data

(63) Continuation of application No. PCT/EP2003/007492, filed on Jul. 10, 2003.

(30) Foreign Application Priority Data

Jul. 11, 2002 (DE) ............... 102 32 130

(51) Int. Cl.
*G01R 27/08* (2006.01)
(52) U.S. Cl. .................. 324/718; 324/715; 429/13; 429/30
(58) Field of Classification Search ........... 324/718, 324/715
See application file for complete search history.

(56) References Cited

U.S. PATENT DOCUMENTS

| | | | |
|---|---|---|---|
| 3,499,306 A * | 3/1970 | Pearson | ............ 72/11.7 |
| 4,803,428 A | 2/1989 | Crostack | |
| 5,223,797 A * | 6/1993 | Mayer et al. | ............ 324/688 |
| 5,495,177 A * | 2/1996 | Liang et al. | ............ 324/663 |
| 5,500,606 A * | 3/1996 | Holmes | ............ 324/761 |
| 5,661,406 A | 8/1997 | Daily et al. | |
| 6,224,746 B1 | 5/2001 | Meissner et al. | |
| 6,295,512 B1 | 9/2001 | Bryant | |
| 6,331,778 B1 | 12/2001 | Daily et al. | |
| 6,359,447 B1 * | 3/2002 | Sighinolfi | ............ 324/663 |
| 6,798,221 B1 * | 9/2004 | Wang et al. | ............ 324/713 |
| 6,804,625 B1 | 10/2004 | Bryant | |

FOREIGN PATENT DOCUMENTS

| WO | WO 99/48422 A1 | 9/1999 |
|---|---|---|
| WO | WO 00/28286 A1 | 5/2000 |

* cited by examiner

*Primary Examiner*—Anjan Deb
*Assistant Examiner*—John Zhu
(74) *Attorney, Agent, or Firm*—Alston & Bird LLP

(57) ABSTRACT

In order to create a device for testing a membrane electrode assembly, by means of which fabricated membrane electrode assemblies can be tested in a non-destructive manner, a first contact device is provided for bringing a first electrode side of the test object into electrical contact, a second contact device is provided for bringing a second electrode side of the test object into electrical contact, the first and second contact devices being electrically conductive at least in the contact area, and the first contact device and/or the second contact device having a plurality of electrically conductive contact segments spaced from one another, and a conductivity measuring device is provided for measuring the conductivity of the test object segmentwise in a location-resolved manner.

31 Claims, 2 Drawing Sheets

DEVICE AND METHOD FOR TESTING A MEMBRANE ELECTRODE ASSEMBLY

CROSS-REFERENCE TO RELATED APPLICATIONS

The present application is a continuation application of International Application No. PCT/EP2003/007492, filed Jul. 10, 2003, and also claims the benefit of German Application No. 102 32 130.2, filed Jul. 11, 2002, which are incorporated herein by reference in their entirety and for all purposes.

FIELD OF THE INVENTION

The invention relates to a device and a method for testing a membrane electrode assembly. The testing may include checking, examining, screening, investigating and measuring a membrane electrode assembly.

BACKGROUND OF THE INVENTION

A fundamental problem with membrane electrode assemblies, such as the membrane electrode assemblies of polymer electrolyte membrane fuel cells, is the final inspection, as the membrane can be damaged, and owing to the electrode layers on both sides thereof, this damage is not detectable by visual inspection.

A large number of membrane electrode assemblies, for example, in the order of magnitude of 100, are used in a fuel cell stack. One defective membrane electrode assembly can result in failure of the entire stack.

Therefore, it is important to test a fabricated membrane electrode assembly for its operability. It is known to make spot checks on membrane electrode assemblies after production and to electrochemically characterize these. Afterwards, the tested sample is no longer usable.

SUMMARY OF THE INVENTION

In accordance with the invention, a device and a method for testing a membrane electrode assembly is provided, with which fabricated membrane electrode assemblies can be tested in a non-destructive manner. In accordance with the invention, a device for testing a membrane electrode assembly comprises a first contact device for bringing a first electrode side of the test object (object to be measured) into electrical contact, a second contact device for bringing a second electrode side of the test object (object to be measured) into electrical contact, the first and second contact devices being electrically conductive at least in the contact area, and the first contact device and/or the second contact device having a plurality of electrically conductive contact segments spaced from one another, and a conductivity measuring device for measuring the conductivity of the test object (object to be measured) segmentwise in a location-resolved manner.

In accordance with the invention, contact is made with the first side, and, in particular, electrode side, of the test object (sample) with the first contact device, and, in a corresponding manner, contact is made with the second side of the test object (sample) and, in particular, with the second electrode side of the test object (sample) with the second contact device. A conductivity measurement can then be conducted between the two electrode sides. This is carried out in a location-resolved manner by means of the segmented construction of at least one of the two contact devices, i.e., determined by the arrangement and construction of the individual contact segments. A conductivity measurement can be carried out in a non-destructive manner, so that the inventive device can be integrated in a simple way into the manufacturing process of a membrane electrode assembly.

By means of an impedance-spectroscopic examination, namely measurement of the alternating current resistance, the conductivity of the membrane electrode assembly can be determined in a location-resolved manner owing to the segmented construction of at least one of the two contact devices. The conductivity sheds light on any possible damage to the membrane such as, for example, a leak, which results in a strong drop in the conductivity in the area of the leak. Differences in thickness in the membrane, i.e., local deviations from a mean thickness, can be also be detected by the inventive conductivity measurement. Such differences in thickness are undesired, as they result in a different local proton conduction.

It is, however, also possible to measure the direct current resistance or the impedance between contact segments, and, in particular, neighboring contact segments, within a contact device, i.e., within the first contact device or the second contact device. It is thus possible to measure the transverse conductivity at an electrode layer without measuring the influence of the membrane along with it. In turn, the electrode layer can thus be tested, and, in particular, the thickness of the electrode layer can thereby be determined.

It is particularly advantageous for the test object and the contact device to be linearly displaceable relative to each other so as to enable sensing of the test object in a simple way. In principle, it is possible to hold the test object stationarily and to displace the contact devices relative to the test object. It is, however, particularly advantageous for the contact devices to be held stationarily with respect to translational displacements and for the test object to be transported relative to the contact devices.

In particular, provision is then made for the test object to be passable between the first and second contact devices, so that during transportation of the test object, in order to sense this as completely as possible, the electrical contact with the first and second contact devices is maintained.

As far as manufacturing technology is concerned, it is expedient for the first contact device and/or the second contact device to be constructed as a transport device for transporting the test object relative to the contact device or contact devices. As the contact devices must be in electrical contact with the test object, the mechanical contact required therefor can also be used to bring about a linear transportation of the test object via, in particular, rotational movement of one or both of the contact devices.

The first and second contact devices are advantageously constructed in such a way that the electrical contact is maintained during the transportation movement of the test object. This is achievable in a simple way by the first contact device comprising a roller. Furthermore, it is expedient for the second contact device to comprise a roller. Via these rollers, which, in particular, are constructed as transport rollers, the test object can then be transported, and an electrical contact is automatically provided.

To be able to conduct a location-resolved measurement, there are arranged between neighboring contact segments of the first contact device and/or of the second contact device, which can be brought into electrical contact with the test object, areas which are not in electrical contact with the test object when electrical contact is made with the contact segments. This is achievable, for example, by the corresponding areas being set back, so that they do not come into mechanical contact with the test object. Provision may, however, also be made for these areas to be produced by means of an insulating material. In the latter case, a larger mechanical contact surface is obtained for the mechanical contact between the corresponding contact device and the test object. This is advantageous for transportation of the test object. The resolution with respect to location of the measurement is then determined by the arrangement and dimensions of the contact segments.

In particular, provision is made for the contact segments of the first contact device and/or of the second contact device to be spaced in parallel from one another. These then measure the same conductivity component. Furthermore, it is expedient for the contact segments of the first contact device and/or of the second contact device to be uniformly spaced from one another, so that a uniform measurement with respect to location can be conducted.

Furthermore, it is expedient for the contact segments to be aligned in parallel with or at a small angle to a direction of transportation. A current path for the current flow between the first contact device and the second contact device can thereby be set up, with the current, which is substantially parallel to the direction of transportation, being picked up via the associated contact segment. The sensing of the test object can be carried out in parallel tracks.

It is particularly advantageous for the impedance between the first contact device and the second contact device to be determinable segmentwise by means of the conductivity measuring device. An impedance can then be associated with each contact segment in a time-resolved manner, and in the event of deviations in a certain contact segment, the area being examined can then be detected as defective.

The impedance is obtained via presetting/measurement of an alternating voltage/an alternating current or vice versa. For example, an alternating voltage of a certain frequency between the first contact device and the second contact device is preset and the alternating current between the two contact devices is then determined segmentwise, or an alternating current is preset and the alternating voltage is determined segmentwise between the two contact devices. In this way, location-resolved conductivity information is obtained for the membrane electrode assembly.

Furthermore, it is advantageous for the direct current resistance or the impedance between contact segments of a contact device, i.e., between contact segments, and, in particular, neighboring contact segments, of the same contact device, to be measurable by means of the conductivity measuring device. The conductivity of an electrode layer can thereby be determined, as the current then flows within an electrode layer. In turn, the transverse conductivity within such an electrode layer can then be determined in this way, and, therefore, for example, the thickness of this electrode layer detected.

Provision may be made for the spacing between axes of rollers of the first contact device and the second contact device to be adjustable. In principle, the adjustability can take place in two different directions, namely in the direction of transportation and transversely thereto. In the transverse direction, the adjustability makes it possible for membrane electrode assemblies of different thicknesses to also be passed through. Via the adjustability in the direction of transportation, the current path along the direction of transportation, i.e., the spacing in the direction of transportation between the contact areas in which the second contact device and the first contact device electrically contact the test object, is adjustable via setting of a track length. This determines the resolution with respect to location in the direction of transportation. If, for example, this spacing is large, then a long path can be tested in a short time in the direction of transportation, which thus saves time. With such a long path, there may, however, be a decline in the accuracy of the measurement. Therefore, it may prove expedient, particularly when the test object is to be examined with a high degree of precision, for the spacing between the two contact devices in the direction of transportation to be reduced and, in the ideal case, for no such spacing to exist, i.e., for the axes of the two rollers to lie opposite each other in relation to the direction of transportation.

To enable electrical contact to be made and transportation of the test object to be carried out simultaneously, it is advantageous for the first contact device and/or the second contact device to be connected by means of sliding contacts to the conductivity measuring device. It is thus possible for signals to be tapped from the first contact device and/or the second contact device, independently of their rotational position.

In a variant of an embodiment, the second contact device has a uniform surface with respect to its electrical characteristics, i.e., it is not segmented.

An impedance measurement can then be conducted between the second contact device and the spaced contact segments of the first contact device, with the resolution with respect to location being determined by the contact segments.

Provision may also be made for the first and second contact devices to be provided with contact segments. Thus, an impedance measurement can be conducted between certain contact segments of the two contact devices.

In particular, provision is made for the impedance between contact segments, spaced from one another transversely to the direction of transportation, of the first contact device and the second contact device to be measurable. When the second contact device has a uniform surface with respect to its electrical conductivity, then essentially the conductivity transversely to the membrane surface (vertical conductivity) is determined in the impedance measurement between contact segments of the first contact device and the second contact device, particularly when the two contact devices are standing opposite each other. If, however, impedance measurements are carried out between contact segments, spaced transversely to the direction of transportation, of the two contact devices, then a transverse conductivity can also be determined, i.e., a conductivity with a component parallel to the membrane surface. The resolution with respect to location can thereby be increased, as in addition to the track-like measurement predetermined by the segments, deviations in conductivity transversely to these tracks can also be detected.

Provision may also be made for a switch-over measurement to be made by the conductivity measuring device, with a charging procedure and a discharging procedure being performed between the first contact device and the second contact device. If charging procedure and discharging procedure differ not only with respect to their sign, such a change in value is then an indication that there is a leak. Such a leak changes the dielectric characteristics between the opposite contact surfaces, which affects the discharging procedure. Thus, a quasi-impedance is determined quasi-statically with the corresponding method. The method can also be used for non-conductive contact surfaces.

Furthermore, in accordance with the invention, a method for testing a membrane electrode assembly is provided, wherein the test object is brought on a first electrode side into electrical contact with a first contact device which is electrically conductive at least in the contact area, and is brought on a second electrode side into electrical contact with a second contact device which is electrically conductive at least in the contact area, with the first contact device and/or the second contact device being brought into electrical contact with the test object via spaced contact segments, and the electrical conductivity being measured segmentwise in a location-resolved manner. The inventive method has the advantages set forth hereinabove in conjunction with the inventive device. Further advantageous configurations of the inventive method were explained hereinabove in conjunction with the inventive device.

In particular, provision is made for the impedance between opposite contact areas of the first contact device and the second contact device to be measured. The vertical conductivity, in particular, of the membrane transversely to a surface can thereby be determined in an impedance-spectroscopic manner.

Provision may also be made for the impedance between contact areas, offset in relation to a direction of spacing, of the first contact device and the second contact device to be measured. A transverse component of the electrical conductivity (in a surface direction) can thereby also be determined in an impedance-spectroscopic manner, so as to increase the resolution with respect to location.

The location of a conductivity measurement on the test object is expediently determined via transportation parameters, so that, for example, the location of a deviation in conductivity on the test object is detectable. For example, when one or several transport rollers is or are used, the location of the conductivity measurement can be determined via angular position and angular velocity of the transport rollers.

Furthermore, the object mentioned at the outset is accomplished by a method for testing a membrane electrode assembly or a membrane for a membrane electrode assembly, wherein the test object is brought between a first contact device and a second contact device, with both of the contact devices being provided with contact segments spaced from one another, which are electrically chargeable, and respectively associated contact segments of the two contact devices are electrically charged and discharged as contact segment pairs, in order to determine dielectric characteristics of the test object between the contact segments of a contact segment pair.

In this way, insulating test objects, such as a membrane, can also be tested segmentwise in a location-resolved manner. By testing for a deviation between the charging behavior and the discharging behavior, a leak in a membrane as test object is, for example, detectable. This is due to a change in the dielectric characteristics of the test object between the two contact devices. By charging the contact devices, which, in particular, are constructed as transport rollers, a quasi-impedance measurement can thus be conducted on the test object without a current having to flow through it.

The following description of a preferred embodiment of the invention serves in conjunction with the drawings to explain the invention in greater detail.

BRIEF DESCRIPTION OF THE DRAWINGS

Preferred exemplary embodiments of the invention are explained in more detail hereinbelow with reference to the drawings, which are not necessarily drawn to scale, and wherein.

DETAILED DESCRIPTION OF THE INVENTION

The present invention now will be described more fully hereinafter. However, this invention may be embodied in many different forms and should not be construed as limited to the embodiments set forth herein; rather, these embodiments are provided so that this disclosure will satisfy applicable legal requirements. Like numbers refer to like elements throughout.

Figure 1:
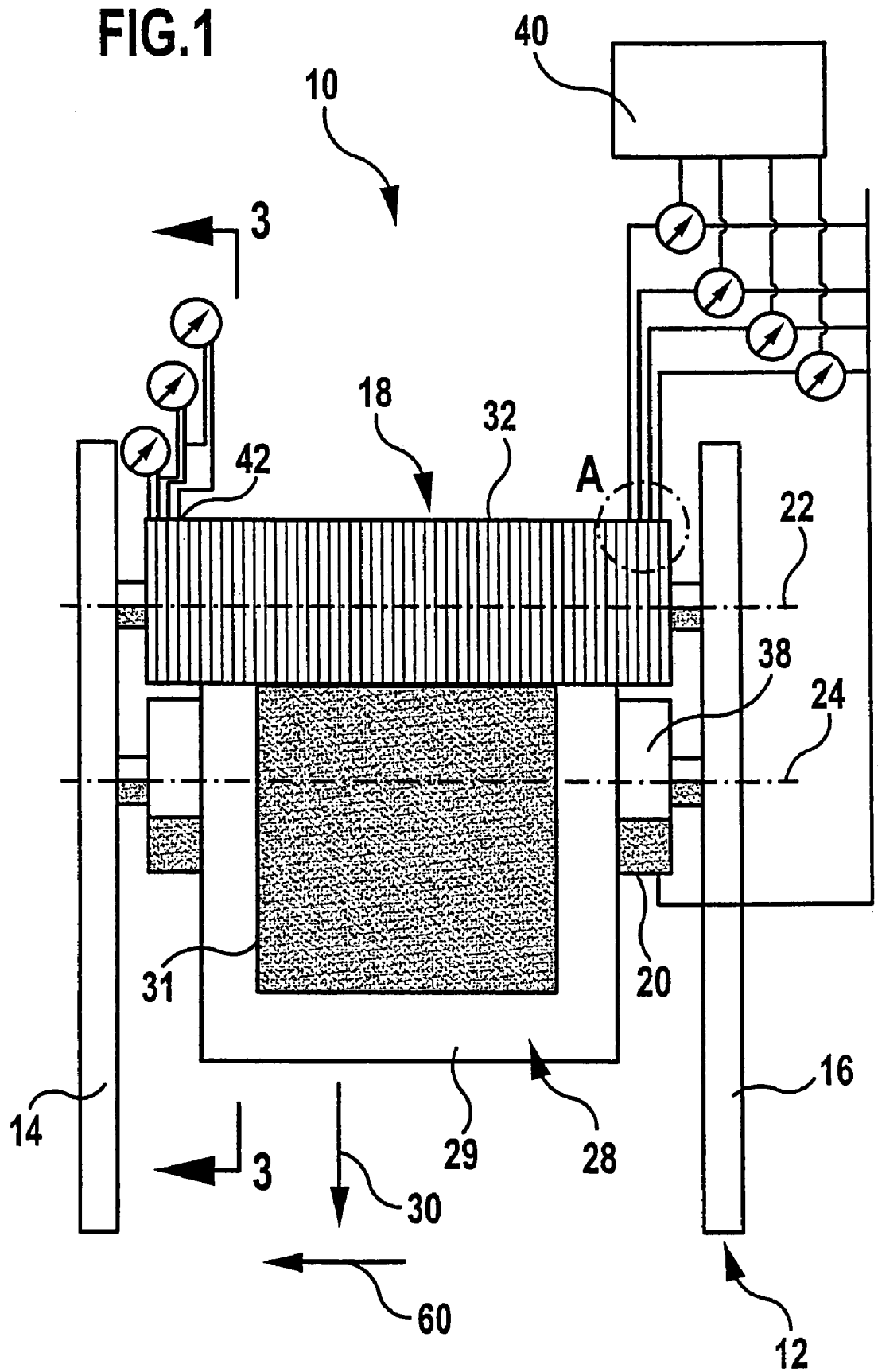
FIG. 1 shows a schematic representation of an embodiment of an inventive device for testing a membrane electrode assembly in a plan view.

An embodiment of an inventive device for testing a membrane electrode assembly, shown in FIG. 1 and generally designated 10 therein, comprises a frame device 12 with opposite frame elements 14 and 16, on which a first contact device 18 and a second contact device 20 are rotatably mounted.

The first contact device 18 is constructed as a rotatable roller and, in particular, as a transport roller, which is mounted in the frame device 12. The second contact device 20 is likewise constructed as a roller and, in particular, as a transport roller, and is mounted on the frame device 12. The axis of rotation 22 of the first contact device 18 and the axis of rotation 24 of the second contact device 20 are arranged in parallel spaced relation to each other in a direction of spacing 26 (shown in FIG. 3).

A membrane electrode assembly which is to be tested can be passed as test object 28 between the two contact devices 18 and 20, and this test object 28 can be transported in a direction of transportation 30 by means of the contact devices 18 and 20. The direction of transportation 30 lies transversely and, in particular, perpendicularly, to the direction of spacing 26.

The membrane electrode assembly 28 to be tested comprises a membrane 29 with electrode layers 31 arranged on opposite sides of the membrane 29.

Provision may be made for the spacing in the direction of spacing 26 between the axes of rotation 22 and 24 to be adjustable so as to adapt this spacing to the thickness of the test object 28 to be transported and passed through.

Provision may also be made for a spacing between the two contact devices 18 and 20 in the direction of transportation 30 (transversely to the direction of spacing 26) to be adjustable. In this way, as will be explained in greater detail hereinbelow, the sensing area on the test object 28 can be adjusted in the direction of transportation 30.

Figure 2:
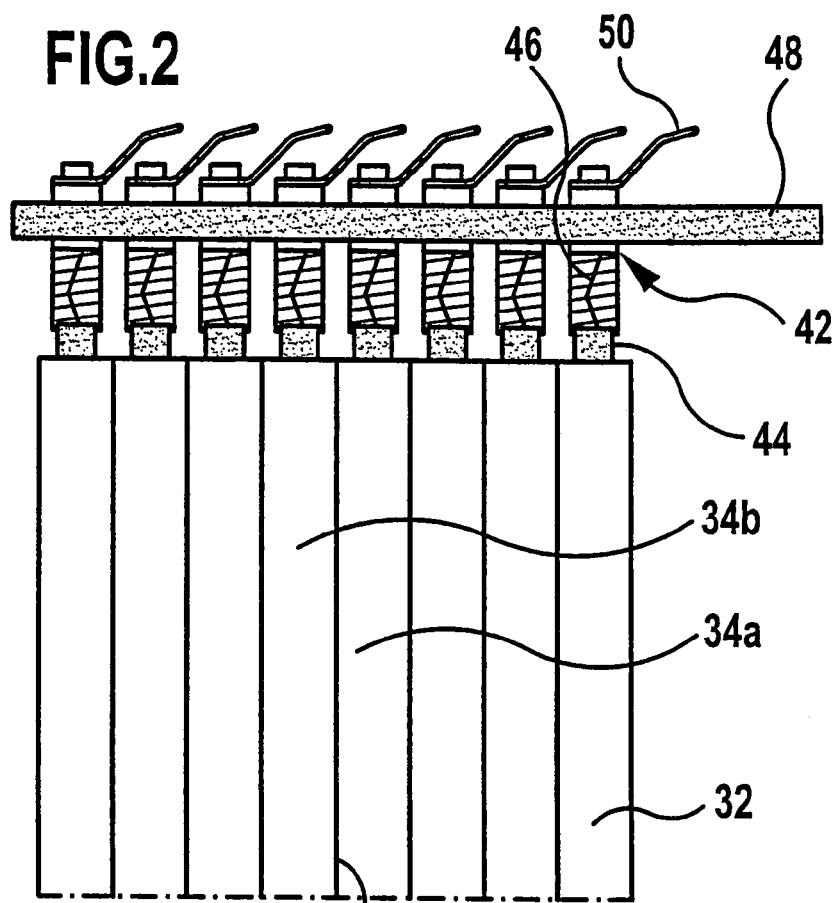
FIG. 2 shows an enlarged representation of the area A in FIG. 1.

The first contact device 18 comprises a plurality of contact segments 32 which are arranged in parallel spaced and, in particular, uniform, relation to one another transversely to the direction of transportation 30. Such a contact segment 32 is electrically conductive, so that an electrical contact is established when it contacts the test object 28. There is formed between neighboring contact segments (for example, contact segments 34a and 34b in FIG. 2) an area 36 which cannot be brought into contact with the test object 28. This can be achieved by, for example, the contact segments 32 projecting over the area 36 in relation to the axis of rotation 22, so that only the contact segments 32 can touch the test object 28, but not the areas 36. Alternatively, provision may also be made for the area 36 to be made of an electrically insulating material at least in the part thereof facing the test object 28.

In a variant of an embodiment, the contact segments 32 are formed by electrically conductive discs or rings which are arranged at a uniform spacing from one another. In particular, the contact segments 32 all have the same diameter in relation to the axis 22.

The first contact device 18 is provided with contact segments 32 in such a way that transversely to the direction of transportation 30 the test object 28 is contactable in its entire width via contact segments 32.

The second contact device 20 likewise comprises conductive contact areas. In a first variant of an embodiment, the second contact device 20 is not segmented, i.e., it has a uniform surface 38 also with respect to the electric characteristics.

Figure 3:
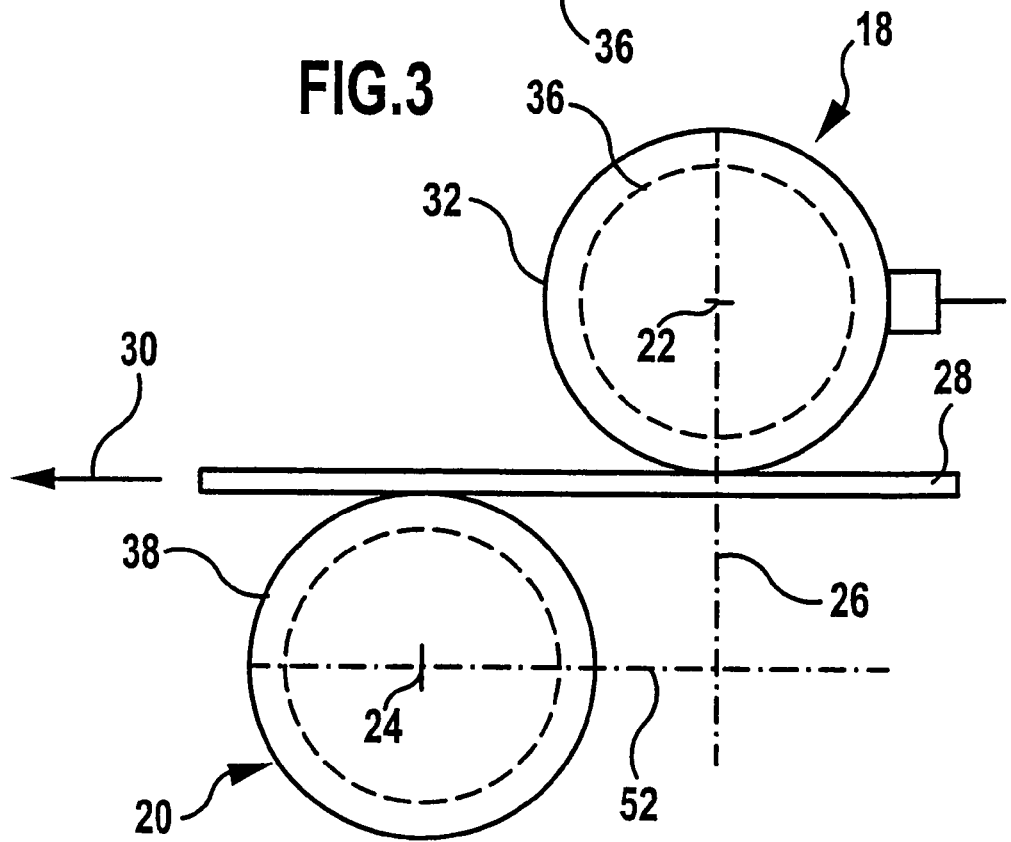
FIG. 3 shows a sectional view taken along line 3—3 according to FIG. 1.

Provision may, however, also be made for the second contact device 20 to be provided in the same way as the first contact device 18 with contact segments 32 (as indicated by broken lines in FIG. 3).

By means of a conductivity measuring device 40, conductivity measurements can be conducted on the test object 28 via the first contact device 18 and the second contact device 20, so as to be able to test this in a non-destructive manner. For this purpose, an alternating voltage, typically having a frequency in the order of magnitude of 10 kHz, can be applied between the second contact device 20 and the first contact device 18.

An individual measurement current flowing between the second contact device 20, the test object 28 and the respective contact segment 32 of the first contact device 18 can be tapped at each contact segment 32. For this purpose, each contact segment 32 is provided with an individual terminal 42 for connection to the conductivity measuring device 40.

In particular, the terminal 42 is formed by a sliding contact comprising a carbon pin 44 which is pressed via a spring 46 against the associated contact segment 32, so that an electrical contact is established in each angular position (rotational position) of the first contact device 18.

The spring 46 is supported on a stationary holder 48, from which electrical connection lines 50 then lead to the measuring device 40. Each line 50 is individually associated with a contact segment 32, so that the number of lines 50 corresponds to the number of contact segments 32.

Since the current flow between the second contact device 20 and the contact segments 32 of the first contact device 18 is individually measurable in this way, with a preset alternating voltage applied between the first contact device 18 and the second contact device 20, the impedance associated with each contact segment 32 can be individually determined. Since each contact segment 32 is, in turn, in contact with a certain area of the test object 28, the conductivity of the test object 28 can thus be determined segmentwise in a location-resolved manner (predetermined by the spatial arrangement of the contact segments 32).

The inventive device operates as follows. An alternating voltage is applied between the first contact device 18 and the second contact device 20. The test object 28 is transported in the direction of transportation 30 between the two contact devices 18 and 20, which are constructed as transport rollers. The two contact devices 18 and 20 are in mechanical and electrical contact with respective opposite electrode sides of the test object 28.

If the surface 38 of the second contact device 20 is of uniform construction, there flows through each contact segment 32, if the test object 28 is of uniform construction, the same current, i.e., the impedance determined should not differ from contact segment 32 to contact segment 32.

If, however, the test object 28 is, for example, of different thickness, or, if the membrane of the membrane electrode assembly is locally damaged, this results in conductivity variations which can be determined by the inventive device. If, for example, there is a small leak in the membrane, there is then a strong drop in the conductivity in this area. Differences in thickness result in a different proton conduction in the membrane, and these can be determined in a location-resolved manner via the impedance-spectroscopic conductivity measurement according to the invention.

By means of the inventive contact segments 32, the conductivity, when the impedance is measured between the second contact device 20 and the first contact device 18 and the second contact device 20 is not segmented, is measured in tracks parallel to the alignment of the contact segments 32. If these are aligned parallel to the direction of transportation 30, the test object 28 is then sensed accordingly in tracks parallel to the direction of transportation 30. The resolution with respect to location transversely to the direction of transportation 30 (direction 60 in FIG. 1) is then determined by the thickness of the contact segments 32 in the direction 60 and the thickness of the insulating areas 36. A finer resolution is achieved by reducing the thickness of the contact segments 32.

Via the spacing between the two contact devices 18 and 20 in a direction 52 transversely to the direction of spacing 26 (parallel to the direction of transportation 30) the sensed area can be adjusted in relation to the direction of transportation 30, i.e., the current path along the test object 28 between the first contact device 18 and the second contact device 20 can be adjusted. With a short current path, one obtains a high resolution with respect to location also in the direction of transportation 30, whereas with longer current paths (adjusted via the spacing in the direction 52) a quicker measurement with respect to the total area of the test object 28 can be conducted. In the case of a short current path and in a limit case with contact devices 18, 20 facing each other in the direction of spacing 26, essentially the vertical conductivity of the test object 28 is determined. With longer current paths (i.e., with finite spacing of the axes 22, 24 in the direction 52) the impedance measurement also includes a transverse component of the conductivity in the direction of transportation 30.

The impedance associated with the contact segments 32 is continuously determined via the first contact device 18 in a time-resolved manner. At each point in time, the measurement point along a track can be detected by the angular position of the first contact device 18 and the transportation speed of the test object 28 through the device 10 being determined. This, in turn, is determined by the angular velocities of the two transport rollers of the contact devices 18 and 20.

A membrane electrode assembly as test object 28 can be tested in a non-destructive manner by the inventive device and by the inventive method. This test can be carried out as final inspection after manufacture, so as to register, in particular, holes and deviations in thickness in the membrane. The test can also be carried out immediately after fabrication of functional layers such as electrode layers, for example, immediately after spraying-on of electrode layers.

If the axes of rotation 22 and 24 of the two contact devices 18 and 20 are located exactly opposite each other in the direction of spacing 26, then essentially the vertical conductivity of the membrane electrode assembly is measured. If the axes of rotation are offset in the direction 52, then a part of the conductivity in the direction of transportation 30 within a track allocated by the respective contact segment is also measured. This component can be varied by adjusting this spacing accordingly.

It is, however, also possible to determine the conductivity transversely to the direction of spacing 26 and to the direction of transportation 30 (in the direction 60) by the second contact device 20 also being segmented, i.e., provided with contact segments 32 with insulating areas lying therebetween. If contact segments 32 lie opposite the first contact device 18, then, as described hereinabove, a measurement of the conductivity in the direction of spacing 26 (possibly with a component in the direction 52) can be conducted.

If, however, the corresponding associated contact segments 32 are also offset in the direction of the axis of rotation 22 (in the direction 60) the total impedance measured then also contains a conductivity component of an electric conductivity in the direction of the axis of rotation 22, i.e., transversely to the directions 52 and 26 (perpendicularly to the drawing plane of FIG. 3).

This component is separable from the conductivity component in the direction of spacing 26 when, for example, the test object 28 is passed through a first contact device 18 and a second contact device 20 with respective offset contact segments, with the second contact device 20 having a uniformly electrically conductive surface 38. In this way, a test can then be carried out with high precision as the conductivity can be determined segmentwise in a location-resolved manner in at least two spatial directions (26 and 60).

Alternatively, provision may also be made for a voltage to be applied between neighboring contact segments 34a, 34b of the first contact device 18, so that a current is impressed. This current then flows through the electrode layer 31, and the conductivity within this electrode layer 31 can be determined by a direct current resistance measurement or by an impedance measurement (determination of the relationship between preset voltage and resulting current). Such a conductivity measurement can be carried out essentially without the membrane 29 having any influence thereon. In this way, for example, the thickness of the electrode layer 31 can then be determined or flaws in the coating can be detected.

With the inventive device, it also possible to measure insulating objects, such as a membrane, in a location-resolved manner. For this purpose, the first and second contact devices 18, 20 each comprise contact segments 32. These are electrically charged and then discharged, and the charging procedure and the discharging procedure are observed. If, during the discharging procedure, not only a change of sign but also a change in value occurs, this indicates that there is a leak in the membrane. The dielectric characteristics of the test object between the two contact devices 18, 20 are detected segmentwise in a location-resolved manner. For this purpose, contact segments 32, and, in particular, opposite contact segments 32, of the two contact devices 18, 20 are associated with one another for the measurement.

Many modifications and other embodiments of the inventions set forth herein will come to mind to one skilled in the art to which these inventions pertain having the benefit of the teachings presented in the foregoing description. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. Device for testing a membrane electrode assembly, comprising:
   a first contact device for bringing a first electrode side of the test object into electrical contact;
   a second contact device for bringing a second electrode side of the test object into electrical contact;
   wherein said first contact device and said second contact device are electrically conductive at least in the contact area; and
   wherein at least one of said first contact device and said second contact device has a plurality of electrically conductive contact segments spaced from one another; and
   a conductivity measuring device for measuring the conductivity of the test object segmentwise in a location-resolved manner.

2. Device in accordance with claim 1, wherein the test object and the contact devices are linearly displaceable relative to one another.

3. Device in accordance with claim 1, wherein the test object is transportable between the first contact device and the second contact device.

4. Device in accordance with claim 1, wherein at least one of the first contact device and the second contact device is constructed as transport device for transporting the test object relative to the contact devices.

5. Device in accordance with claim 4, wherein the first contact device and the second contact device are constructed in such a way that the electrical contact is maintained during the transportation movement of the test object.

6. Device in accordance with claim 1, wherein the first contact device comprises a roller.

7. Device in accordance with claim 1, wherein the second contact device comprises a roller.

8. Device in accordance with claim 1, wherein areas which are not in electrical contact with the test object when the contact segments are in contact therewith lie between neighboring contact segments of at least one of the first contact device and the second contact device, the neighboring contact segments being able to be brought into electrical contact with the test object.

9. Device in accordance with claim 1, wherein the contact segments of at least one of the first contact device and the second contact device are spaced in parallel from one another.

10. Device in accordance with claim 1, wherein the contact segments of at least one of the first contact device and the second contact device are spaced uniformly from one another.

11. Device in accordance with claim 1, wherein a contact segment is in the form of a disc or a ring.

12. Device in accordance with claim 1, wherein the contact segments are aligned in parallel with or at a small angle to the direction of transportation.

13. Device in accordance with claim 1, wherein the impedance between the first contact device and the second contact device is determinable segmentwise by means of the conductivity measuring device.

14. Device in accordance with claim 13, wherein an alternating voltage of a certain frequency is able to be preset or an alternating current applied between the first contact device and the second contact device.

15. Device in accordance with claim 1, wherein the direct current resistance or the impedance between contact segments of a contact device is measurable by means of the conductivity measuring device.

16. Device in accordance with claim 1, wherein both the first contact device and the second contact device comprise a roller, the spacing between the axes of the rollers of the first contact device and the second contact device being adjustable.

17. Device in accordance with claim 1, wherein at least one of the first contact device and the second contact device is connected by means of sliding contacts to the conductivity measuring device.

18. Device in accordance with claim 1, wherein the first contact device and the second contact device are provided with contact segments.

19. Device in accordance with claim 18, wherein the impedance between contact segments, spaced from one another transversely to the direction of transportation, of the first contact device and the second contact device is measurable.

20. Device in accordance with claim 1, wherein a switch-over measurement with a charging procedure and a discharging procedure being carried out between a first contact device and a second contact device is performable by means of the conductivity measuring device.

21. Method for testing a membrane electrode assembly, comprising:
bringing the test object on a first electrode side into electrical contact with a first contact device which is electrically conductive at least in the contact area;
bringing the test object on a second electrode side into electrical contact with a second contact device which is electrically conductive at least in the contact area;
wherein at least one of the first contact device and the second contact device is brought into electrical contact with the test object via spaced contact segments; and
measuring the electrical conductivity segmentwise in a location-resolved manner.

22. Method in accordance with claim 21, wherein the test object is transported by means of at least one of the first contact device and the second contact device relative to these.

23. Method in accordance with claim 21, wherein an alternating voltage is applied or an alternating current is preset between the first contact device and the second contact device.

24. Method in accordance with claim 23, wherein the impedance between the first contact device and the second contact device is measured.

25. Method in accordance with claim 24, wherein the impedance between contact areas of the first contact device and the second contact device, which lie opposite one another relative to the contact devices in relation to the direction of transportation of the test object, is measured.

26. Method in accordance with claim 24, wherein the impedance between contact areas of the first contact device and the second contact device, which are transversely offset relative to the contact devices in relation to the direction of transportation of the test object, is measured.

27. Method in accordance with claim 21, wherein the direct current resistance or the impedance between contact segments of a contact device is measured.

28. Method in accordance with claim 21, wherein the location of a conductivity measurement on the test object is determined via transportation parameters.

29. Method in accordance with claim 28, wherein in the event one or more transport rollers are used, the location of the conductivity measurement is determined via angular position and angular velocity of the one or more transport rollers.

30. Method for testing a membrane electrode assembly or a membrane for a membrane electrode assembly, comprising:
bringing the test object between a first contact device and a second contact device, both of said contact devices being provided with contact segments spaced from one another, said contact segments being electrically chargeable; and
charging and discharging respectively associated contact segments of the two contact devices electrically as contact segment pairs, in order to determine dielectric characteristics of the test object between the contact segments of a contact segment pair.

31. Method in accordance with claim 30, wherein the test object is transported between the two contact devices.

* * * * *